Nov. 12, 1968  J. GOLDBERG  3,410,283
COMBINATION IMPLEMENT FOR HAIRDRESSING
Filed July 8, 1965
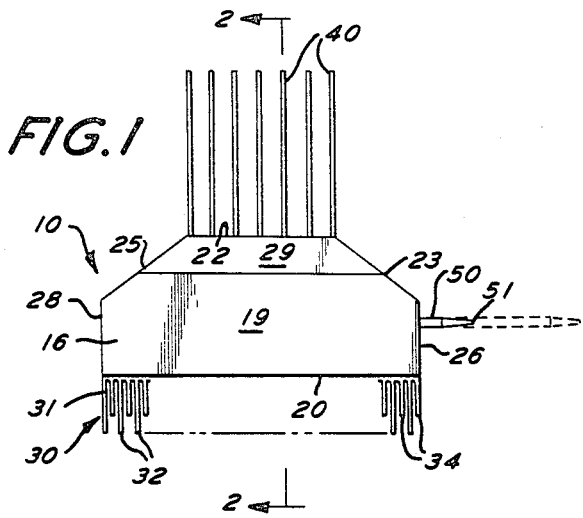
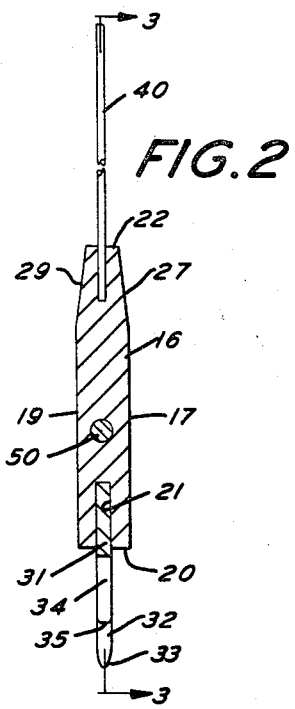
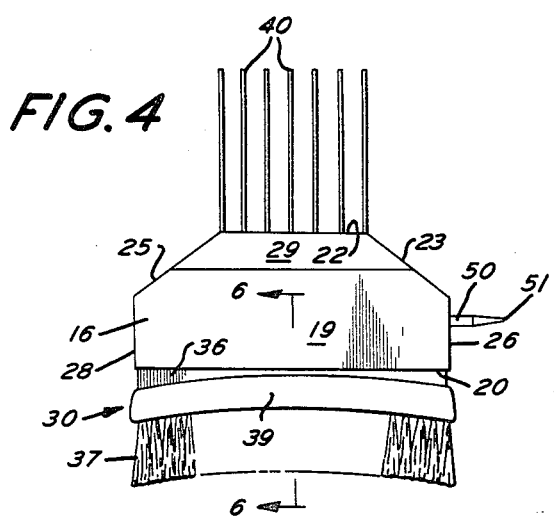
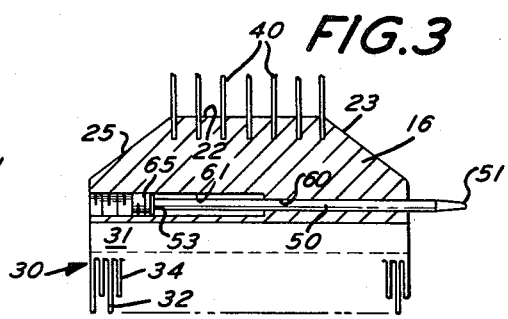
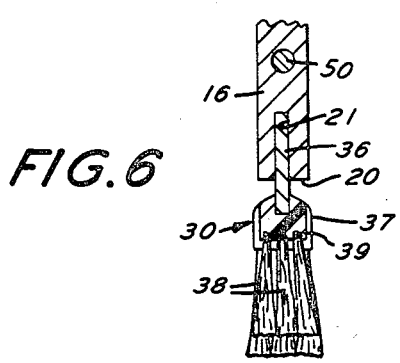
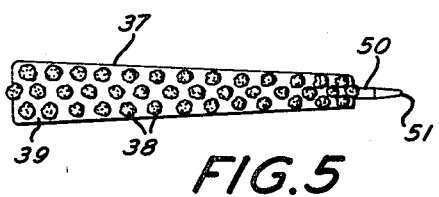
INVENTOR.
JULES GOLDBERG
BY
Seidel & Gonda
ATTORNEYS.

3,410,283
COMBINATION IMPLEMENT FOR HAIRDRESSING
Jules Goldberg, 8611 Thouron Ave.,
Philadelphia, Pa. 19150
Filed July 8, 1965, Ser. No. 470,519
5 Claims. (Cl. 132—120)

ABSTRACT OF THE DISCLOSURE

A combination hairdressing implement is disclosed for manipulating hair including the manipulation of stretching, back combing, teasing and smoothing. A comb and a brush are removably and interchangeably supported along one edge of a handle. Prongs extend from the opposite edge of the handle. An extensible rod, stiffer than said prongs, is received in said handle.

---

This invention relates generally to a hairdressing implement, and in particular, to a combination hairdressing implement for conveniently and quickly performing a variety of hairdressing operations.

Hairdressing is an art requiring the services of skilled artisans, trained to perform a variety of hairdressing procedures and operations. Clearly, it is advantageous to conserve the time of highly skilled and expensive personnel. Furthermore, many of the hairdressing techniques require performance in immediate sequences, that is, a very short interval of time between sequences. In the past, a variety of hairdressing implements have been provided for diverse hairstyling techniques and operations. However, misplacement of the multiplicity of prior art implements is a tendency which has caused a great deal of lost time. Furthermore, some hairstyling techniques require a sequence of close following procedures which do not allow a hairstylist the luxury and time to change implements. The need for a combination implement is clearly indicated.

Therefore, to overcome the foregoing and other difficulties of the prior art, the general object of this invention is to provide a new and better combination implement for hairdressing.

It is an object of this invention to provide a combination implement for hairdressing which is of a convenient size and configuration for easy and quick digital manipulation thereof.

Another object of this invention is to provide a combination implement for hairdressing which has removable and interchangeable combing elements thereon for performing a variety of hairdressing operations.

It is still an additional object to provide a combination hairdressing implement which is economical to produce and which utilizes conventional, currently available materials that lend themselves to standard mass production manufacturing techniques.

Other objects will appear hereafter.

For the purpose of illustrating the invention, there is shown in the drawings a form which is presently preferred; it being understood, however, that this invention is not limited to the precise arrangements and instrumentalities shown.

Other objects and a fuller understanding of the invention may be had by referring to the following description and claims, taken in conjunction with the accompanying drawings in which:

FIGURE 1 is a plan view illustrating the combination hairdressing implement of the present invention.

FIGURE 2 is an enlarged cross-sectional view taken along line 2—2 of FIGURE 1.

FIGURE 3 is a cross-sectional view taken along line 3—3 of FIGURE 2.

FIGURE 4 is a plan view of the invented implement showing that a brush has been interchanged for the comb implement.

FIGURE 5 is a bottom view of FIGURE 4.

FIGURE 6 is an enlarged partial cross-section of FIGURE 4 taken along line 6—6.

Referring to the drawings in detail, wherein like numerals indicate like elements, there is shown in FIGURE 1 a drawing of the combination hairdressing implement of the present invention designated generally as 10. The implement 10 has a handle member 16 which is preferably of a material characterized by its light weight and strength, such as aluminum. As illustrated, the handle member 16 is relatively flat at sides 17, 19. An edge 20 of the handle member 16 is provided with a deep slot 21 running therealong. An opposite edge 22, as illustrated, has portions 23, 25 inclined toward ends 26, 28 of the handle member 16. The sides 17, 19 each have portions 27, 29 tapering toward the opposite edge 22.

A removable and interchangeable comb means is indicated generally at 30. In FIGURES 1 through 3 the comb means 30 is provided by a comb element 31. The remaining FIGURES 4 through 6 illustrate a comb means 30 as being a brush element 37. It is understood, of course, that the comb elements, so demonstrated, are merely exemplary and not exclusive, there being a variety of different forms and types according to the technique and procedure desired.

The comb 31 has a plurality of spaced teeth 32, 34, alternately long and short length respectively. The long teeth 32 have rounded tips 33 and the short teeth 34 have flat tips 35. The comb thus described is particularly efficient for teasing and backcombing of a body of hair. The thickness of comb 31 is such that it may be tightly fitted within the deep slot 21 of handle member 16, as may best be visualized by reference to FIGURE 2. The tightness of the fit between the slot 21 and the comb element 31 is sufficient to maintain the comb element and the handle element together and yet enable a quick and convenient separation.

The brush element 37 has a plurality of spaced tufts 38. It is to be noted that the individual bristles of each tuft 38 are of diverse length. A brush body 39 is provided to support the tufts 38 in three spaced rows as illustrated in FIGURE 5. A longitudinal tab 36 extends from the body 39 for engagement within the slot 21 in the handle member 16. Again, the width of the tab 36 tightly fits within the slot 21 in the same manner as the comb element 31. As illustrated, the body 39 is curved and tapered toward one end to provide a brush surface which is tapered and concave. The unique shape of the brushing surface and the diverse bristle length provide an excellent finishing implement for a teased body of hair.

Elongated prongs 40 are provided to extend from the opposite edge 22 as illustrated. The prongs 40 are preferably of strong springy material such as steel and are relatively widely spaced. By way of example, it is desirable to have between five and nine prongs spaced at approximately one quarter inch apart. A practical length for the prongs 40 is between one and three quarter and one and one half inches.

A rod member 50 telescopes into an edge at end 26 of the handle member 16. The rod member 50 has a pointed tip 51 and a collar 53 at the opposite end. The rod 50 telescopes within a longitudinal bore 60 provided within the handle member 16 in a direction paralleling the edge 20 and slot 21, as best illustrated in FIGURE 3. A counter bore 61 accommodates the collared end 53 of the rod 50 and provides a stop means therefor. As illustrated, a portion of the counter bore is threaded and receives a threaded plug 65 which blocks removal of the rod 50.

The elements thus described provide a combination hairdressing implement. The handle member 16 is of convenient size and configuration, with the inclined portions, 23, 25 and the tapered portions 27, 29 providing a convenient shape for digital manipulation of the handle member 16. A comb means 30 is chosen for a desired preparation of a body of hair. For example, a particular comb means is provided for various procedures and techniques, such as teasing, backcombing, French lacing, matting, packing, etc. Each individual body of hair so prepared may then be smoothed, lifted, and placed as desired by a quick turn of the wrist to utilize the prongs 40. The prongs 40 are also useful for curvy and flared positioning of hairstyles having swirls and frothing curls.

The rod 50 may be extended and used as a lifter and placer for relatively heavily packed hair, which may not be handled by the prongs 40. When not in use, the rod 50 is telescoped inward out of the way. Thus, a useful, efficient, and versatile combination hairdressing implement has been disclosed herein.

The invented combination tool can be used in a variety of hairstyling techniques as follows: The combing of day or evening styles, from the buildup of the hairstyle to the smooth and delicate finished lines. Wig styling is a simple procedure with the tool, the wig combouts retain their lines for a longer period. The hair can be packed easier to conceal foundation, and also the life of the wig is increased due to gentle handling of hair with the sculptured combs. Furthermore, the tool allows for an even distribution of surface hair to give the coiffure the movement and undulated look of a professional combout.

The teasing comb 31, described herein, is excellent for use on gentle and fragile hair for packing, stretching, or French lacing without the slightest damage thereto. Thus, the comb is ideal for stretching, backcombing, packing, teasing and smoothing without deep penetration.

The elongated combs 40 have been found excellent for contest work, phantasies and postiche, since the hair can be stretched, lifted, cleaned smooth with a minimum of effort, by the prongs 40, while retaining style lines within definite precision, and thereby cutting the operator's time in half. The prongs 40 are also useful as a separator, for bangs and wispy pixie on the face movement. The rod number 50, or rat tail is extremely useful during hair coloring, as it can be used for lifting, spreading and distribution of color.

Thus, the most ordinary hair styles turn into masterful coiffure creations because of the finished look that can now be achieved by the invented combination tool.

The present invention may be embodied in other specific forms without departing from the spirit or essential attributes thereof and, accordingly, reference should be made to the appended claims, rather than to the foregoing specification as indicating the scope of the invention.

I claim:

1. A combination implement for hairdressing comprising a handle of convenient size and configuration for digital manipulation thereof, said handle having a recess along one edge, a comb means removably supported in said recess with its projections extending generally perpendicular to said edge, said comb means being adapted to be interchanged with a brush a plurality of elongated prongs for smoothing, lifting and placing of hair, said prongs extending from a second edge of said handle, said prongs being generally perpendicular to each of said edges, said one edge being at least as long as said second edge, said prongs being orientated in a row, with the length of said row of said prongs being less than the length of said comb means.

2. A combination implement in accordance with claim 1 including a rod element stiffer than said prongs, said rod element being supported within said handle and being extensible to a position outside of said handle for lifting and placing of hair, said rod being generally parallel to said edges.

3. A combination implement in accordance with claim 1 wherein said comb means has a plurality of spaced teeth of alternate long and short lengths, respectively, said teeth of long length having rounded tips, and said teeth of short lengths having flat tips for teasing and back combining of hair.

4. A combination implement in accordance with claim 1 wherein the brush has a plurality of spaced tufts of bristles having diverse lengths for finishing a body of hair after teasing.

5. A combination implement in accordance with claim 1 wherein said comb means is a comb having projections in the form of spaced parallel teeth, and a rod element disposed within said handle, said rod element being stiffer than said prongs, means on said handle facilitating extending said rod to a position where it projects from said handle, and said rod being generally parallel to said first and second edges.

References Cited

UNITED STATES PATENTS

| | | | |
|---|---|---|---|
| 2,261,755 | 11/1941 | Downs et al. | 132—120 |
| 2,380,730 | 7/1945 | Demyanovich | 132—159 |
| 3,166,081 | 1/1965 | Larson et al. | 132—124 |
| 3,324,865 | 6/1967 | Battaglia | 132—126 |

LOUIS G. MANCENE, *Primary Examiner.*

J. W. MITCHELL, *Assistant Examiner.*